(12) United States Patent
Kim et al.

(10) Patent No.: US 11,994,991 B1
(45) Date of Patent: May 28, 2024

(54) CACHE MEMORY DEVICE AND METHOD FOR IMPLEMENTING CACHE SCHEDULING USING SAME

(71) Applicant: MetisX CO., Ltd., Yongin-si (KR)

(72) Inventors: Do Hun Kim, Yongin-si (KR); Keebum Shin, Seongnam-si (KR); Kwangsun Lee, Yongin-si (KR)

(73) Assignee: MetisX CO., Ltd., Yongin-si (KR)

( * ) Notice: Subject to any disclaimer, the term of this patent is extended or adjusted under 35 U.S.C. 154(b) by 0 days.

(21) Appl. No.: 18/508,840

(22) Filed: Nov. 14, 2023

(30) Foreign Application Priority Data

Apr. 19, 2023 (KR) .................. 10-2023-0051365

(51) Int. Cl.
*G06F 12/08* (2016.01)
*G06F 12/0817* (2016.01)
*G06F 12/0877* (2016.01)

(52) U.S. Cl.
CPC ...... *G06F 12/0828* (2013.01); *G06F 12/0877* (2013.01)

(58) Field of Classification Search
CPC .. G06F 12/08; G06F 12/0871; G06F 12/0875; G06F 3/0659; G06F 3/06; G06F 2212/604; G06N 3/02
See application file for complete search history.

(56) References Cited

U.S. PATENT DOCUMENTS

| | | | |
|---|---|---|---|
| 7,644,221 B1 * | 1/2010 | Chan .................. | G06F 13/387 710/314 |
| 7,747,771 B1 * | 6/2010 | Shah .................. | G06F 15/16 712/18 |

(Continued)

FOREIGN PATENT DOCUMENTS

| | | | |
|---|---|---|---|
| EP | 1868111 A1 * | 12/2007 | ......... G06F 9/30101 |
| JP | 2012-141885 A | 7/2012 | |
| JP | 2019-082917 A | 5/2019 | |
| KR | 10-1025354 B1 | 3/2011 | |
| KR | 10-2012-0008483 A | 1/2012 | |

(Continued)

OTHER PUBLICATIONS

J. Poe, C. Hughes and T. Li, "TransPlant: A parameterized methodology for generating transactional memory workloads," 2009 IEEE International Symposium on Modeling, Analysis & Simulation of Computer and Telecommunication Systems, London, UK, 2009, pp. 1-10.*

(Continued)

*Primary Examiner* — Pierre Michel Bataille
(74) *Attorney, Agent, or Firm* — Sughrue Mion, PLLC

(57) ABSTRACT

It is one object of the present disclosure to provide measures for securing scalability of the queue depth of cache schedulers by utilizing a plurality of cache schedulers. To this end, a cache memory device in accordance with one embodiment of the present disclosure comprises: a request reception unit configured to receive input transactions; a traffic monitoring module configured to monitor traffic of the input transactions; N cache schedulers, wherein N is an integer greater than or equal to 2; a region setting module configured to set N input transaction regions corresponding to each of the N cache schedulers based on the traffic of the input transactions monitored, wherein input transactions are transferred via an input transaction region set in each cache scheduler; and an access execution unit configured to perform cache memory accesses to input transactions scheduled by the N cache schedulers.

7 Claims, 4 Drawing Sheets

(56) References Cited

U.S. PATENT DOCUMENTS

| | | | | |
|---|---|---|---|---|
| 10,241,710 B2* | 3/2019 | Fanning | ............... | G06F 3/0688 |
| 2007/0220517 A1* | 9/2007 | Lippett | ............... | G06F 9/5038 |
| | | | | 718/102 |
| 2008/0168004 A1* | 7/2008 | Kagarlis | ............... | G06Q 40/06 |
| | | | | 702/181 |
| 2014/0283113 A1* | 9/2014 | Hanna | ................... | G06V 40/70 |
| | | | | 726/27 |
| 2017/0091108 A1* | 3/2017 | Arellano | ............ | G06F 13/4282 |
| 2019/0384690 A1* | 12/2019 | Liu | ..................... | G06F 11/3648 |

FOREIGN PATENT DOCUMENTS

| | | | |
|---|---|---|---|
| KR | 10-2019-0090614 A | 8/2019 | |
| KR | 10-2220468 B1 | 2/2021 | |
| KR | 10-2022-0110225 A | 8/2022 | |
| WO | WO-2006124730 A2 * | 11/2006 | ........... G06F 9/3851 |

OTHER PUBLICATIONS

T. Harris et al., "Transactional Memory: An Overview," in IEEE Micro, vol. 27, No. 3, pp. 8-29, May-Jun. 2007.*

Y. Li, B. Akesson, K. Lampka and K. Goossens, "Modeling and Verification of Dynamic Command Scheduling for Real-Time Memory Controllers, " 2016 IEEE Real-Time and Embedded Technology and Applications Symposium (RTAS), Vienna, Austria, 2016, pp. 1-12.*

T. Bai, X. Shen, C. Zhang, W. N. Scherer, C. Ding and M. L. Scott, "A Key-based Adaptive Transactional Memory Executor," 2007 IEEE International Parallel and Distributed Processing Symposium, Long Beach, CA, USA, 2007, pp. 1-8.*

Request for submission of opinion for KR 10-2023-0051365 dated Jul. 14, 2023.

Written Decision on Registration for KR 10-2023-0051365 dated Sep. 1, 2023.

* cited by examiner

[Pre-training session]

[Inference session]

CACHE MEMORY DEVICE AND METHOD FOR IMPLEMENTING CACHE SCHEDULING USING SAME

CROSS-REFERENCE TO RELATED APPLICATION

This application claims priority under 35 U.S.C § 119 to Korean Patent Application No. 10-2023-0051365 filed on Apr. 19, 2023, in the Korean Intellectual Property Office, the entire contents of which is hereby incorporated by reference.

TECHNICAL FIELD

The present disclosure relates to a cache memory device and a method for implementing cache scheduling using the same, and more particularly, to a cache memory device for securing scalability of the queue depth of cache schedulers by utilizing a plurality of cache schedulers and a method for implementing cache scheduling using the same.

BACKGROUND

A cache is a storage device located between a processor (CPU) and a main storage device, and the cache reduces the difference between the computation speed of the processor and the memory access speed, allowing the processor to access data at high speeds. To this end, the cache is located adjacent to the processor and serves as a temporary storage that retrieves and stores data from a main storage device or auxiliary storage device in advance according to the principle of locality of reference.

In general, a processor first accesses data stored in the cache, but if the required data is not stored in the cache, the processor will access data stored in a main storage device or auxiliary storage device. If the processor obtains the required data from the cache, this is called a 'cache hit.' On the other hand, if the processor fails to obtain the required data from the cache but obtains it from the main storage device or auxiliary storage device, this is called a 'cache miss.' A cache hit-rate refers to the number of cache hits/(the number of cache hits+the number of cache misses), and this cache hit-rate is used as a key indicator in determining cache performance.

A cache scheduler is a module for scheduling cache memory accesses corresponding to commands requested by a processor. Such a cache scheduler can support various functions such as out-of-order execution and completion, write early completion, etc., and may be implemented by applying complex mechanisms such as the Tomasulo algorithm in order to enhance memory access efficiency. Therefore, the cache scheduler falls within a module with high complexity among all the designs of the cache memory device.

This high complexity serves as a factor that makes it difficult to increase the queue depth of the cache scheduler. The queue depth represents the number of commands that can be arbitrarily processed at once in a storage resource, and determines the range in which the respective commands can be processed out of order in the cache scheduler. Therefore, the queue depth of the cache scheduler falls within an important parameter that ultimately determines the processing performance of the entire cache, and thus it is necessary to increase the queue depth as much as possible in order to increase the required system performance.

SUMMARY

Therefore, it is one object of the present disclosure to provide measures for securing scalability of the queue depth of cache schedulers by utilizing a plurality of cache schedulers.

However, the objects to be achieved by the present disclosure are not limited to those mentioned above, and may include objects that have not been mentioned but can be clearly understood by those of ordinary skill in the art to which the present disclosure pertains from the description below.

In the following, specific means for achieving the objects of the present disclosure will be described.

As one aspect of the present disclosure, a cache memory device is disclosed. The device comprises: a request reception unit configured to receive input transactions; a traffic monitoring module configured to monitor traffic of the input transactions; N cache schedulers, wherein N is an integer greater than or equal to 2; a region setting module configured to set N input transaction regions corresponding to each of the N cache schedulers based on the traffic of the input transactions monitored, wherein input transactions are transferred via an input transaction region set in each cache scheduler; and an access execution unit configured to perform cache memory accesses to input transactions scheduled by the N cache schedulers, wherein setting the N input transaction regions by the region setting module comprises: generating a histogram representing the number of memory accesses to addresses of the input transactions; computing locations in the histogram where integral values for each of the N input transaction regions are equal; and setting the N input transaction regions based on the computed locations, and wherein the setting the N input transaction regions by the region setting module is performed if there are no input transactions remaining in all or at least some of the N cache schedulers.

In one embodiment, the setting the N input transaction regions in the region setting module is performed based on traffic of input transactions during a first predetermined period before a time point of performing the setting of the N input transaction regions.

In one embodiment, wherein the setting the N input transaction regions in the region setting module comprises: waiting until there are no remaining input transactions by not receiving additional input transactions if input transactions remaining in all of the N cache schedulers at predetermined periods are below a threshold; and resetting the N input transaction regions corresponding to each of the N cache schedulers based on the traffic of the input transactions monitored if there are no input transactions remaining in all of the N cache schedulers.

As one aspect of the present disclosure, a computing system is disclosed. The system comprises: a processor; a main storage device configured to store commands or data associated with a program executed via the processor; an auxiliary storage device configured to assist the main storage device; and a cache memory device located between the processor and the main storage device and configured to temporarily store commands or data of the main storage device or the auxiliary memory device, wherein the cache memory device comprises: a request reception unit configured to receive input transactions; a traffic monitoring module configured to monitor traffic of the input transactions; N cache schedulers, wherein N is an integer greater than or equal to 2; a region setting module configured to set N input transaction regions corresponding to each of the N cache schedulers based on the traffic of the input transactions monitored, wherein input transactions are transferred via an input transaction region set in each cache scheduler; and an access execution unit configured to perform cache memory accesses to input transactions scheduled by the N cache schedulers, wherein setting the N input transaction regions by the region setting module comprises: generating a histogram representing the number of memory accesses to addresses of the input transactions; computing locations in the histogram where integral values for each of the N input transaction regions are equal; and setting the N input transaction regions based on the computed locations, and wherein the setting the N input transaction regions by the region setting module is performed if there are no input transactions remaining in all or at least some of the N cache schedulers.

As one aspect of the present disclosure, a method for implementing cache scheduling is disclosed. The method comprises: receiving input transactions; monitoring traffic of the input transactions; setting N (N is an integer greater than or equal to 2) input transaction regions corresponding to each of N cache schedulers based on the traffic of the input transactions monitored; transferring input transactions to each cache scheduler via an input transaction region set for each of the N cache schedulers; and performing cache memory accesses to input transactions scheduled by the N cache schedulers, wherein the setting the N input transaction regions comprises: generating a histogram representing the number of memory accesses to addresses of the input transactions; computing locations in the histogram where integral values for each of the N input transaction regions are equal; and setting the N input transaction regions based on the computed locations, and wherein the setting the N input transaction regions is performed if there are no input transactions remaining in all or at least some of the N cache schedulers.

In one embodiment, the setting the N input transaction regions is performed based on traffic of input transactions during a first predetermined period before a time point of performing the setting of the N input transaction regions. In one embodiment, the setting the N input transaction regions comprises: waiting until there are no remaining input transactions by not receiving additional input transactions if input transactions remaining in all of the N cache schedulers at predetermined periods are below a threshold; and resetting the N input transaction regions corresponding to each of the N cache schedulers based on the traffic of the input transactions monitored if it is confirmed as a result of the waiting that there are no input transactions remaining in all of the N cache schedulers.

According to embodiments of the present disclosure, measures for securing scalability of the queue depth of cache schedulers by utilizing a plurality of cache schedulers can be provided. More specifically, the cache memory device in accordance with one embodiment of the present disclosure has N (N is an integer greater than or equal to 2) cache schedulers in the cache scheduler unit, and allocates an input transaction region with a statistically identical memory access rate to each cache scheduler based on the number of memory accesses for each address of the input transactions, and thus has a remarkable effect of being able to utilize the queue depth of each of the N cache schedulers to the fullest extent.

However, the effects that can be obtained with the present disclosure are not limited to those mentioned above, and other effects that have not been mentioned will be clearly understood by those of ordinary skill in the art to which the present disclosure pertains from the description below.

BRIEF DESCRIPTION OF THE DRAWINGS

As the following drawings accompanying the present specification illustrate preferred embodiments of the present disclosure and serve to help further understand the technical idea of the present disclosure together with the detailed description of the present disclosure, the present disclosure should not be construed as being limited to those described in such drawings.

DETAILED DESCRIPTION OF THE PREFERRED EMBODIMENTS

Figure 1:
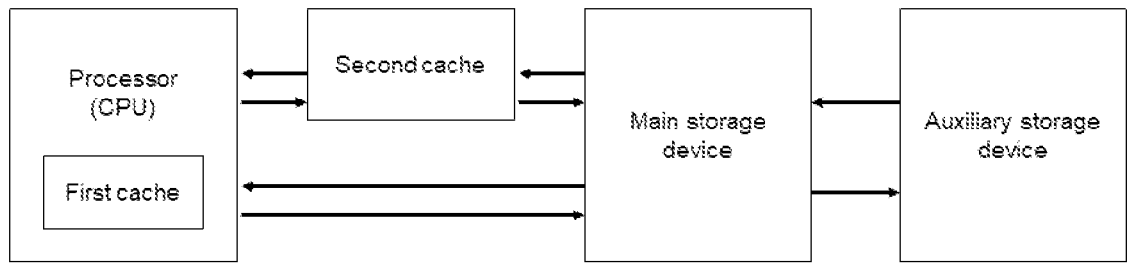
FIG. 1 is a diagram describing the basic configuration of a computing system in accordance with one embodiment of the present disclosure.

The various embodiments described herein are illustrated for the purpose of clearly describing the technical idea of the present disclosure, and are not intended to limit it to particular embodiments. The technical idea of the present disclosure includes various modifications, equivalents, and alternatives of each embodiment described herein, and embodiments obtained by selectively combining all or part of each embodiment. In addition, the scope of the technical ideas of the present disclosure is not limited to the various embodiments or specific descriptions thereof presented below.

Terms used herein, including technical or scientific terms, may have the meaning commonly understood by those of ordinary skill in the art to which the present disclosure pertains unless defined otherwise.

As used herein, expressions such as "include(s)," "may include," "is/are provided with", "may be provided with," "have/has," "can have," and the like mean that target features (e.g., functions, operations, components, or the like) exist, and do not preclude the presence of other additional features. That is, such expressions should be understood as open-ended terms that imply the possibility of including other embodiments.

Singular expressions herein include plural expressions unless the context clearly dictates that they are singular. Further, plural expressions include singular expressions unless the context clearly dictates that they are plural. Throughout the specification, when a part is said to include a component, this means that it may further include other components rather than excluding other components unless particularly described to the contrary.

Further, the term 'module' or 'part' used herein refers to a software or hardware component, and the 'module' or 'part' performs certain roles. However, the 'module' or 'part' is not meant to be limited to software or hardware. The 'module' or 'part' may be configured to reside on an addressable storage medium or may be configured to run one or more processors. Therefore, as one example, the 'module' or 'part' may include at least one of components such as software components, object-oriented software components, class components, and task components, processes, functions, properties, procedures, subroutines, segments of program code, drivers, firmware, microcode, circuitry, data, databases, data structures, tables, arrays, or variables. Functions provided within the components and the 'modules' or 'parts' may be combined into a smaller number of components and 'modules' or 'parts,' or may be further separated into additional components and 'modules' or 'parts.'

According to one embodiment of the present disclosure, a 'module' or 'part' may be implemented with a processor and a memory. The 'processor' should be interpreted broadly so as to encompass general-purpose processors, central processing units (CPUs), microprocessors, digital signal processors (DSPs), controllers, microcontrollers, state machines, and the like. In some circumstances, the 'processor' may also refer to an application-specific integrated circuit (ASIC), a programmable logic device (PLD), a field programmable gate array (FPGA), or the like. The 'processor' may also refer to, for example, a combination of processing devices, such as a combination of a DSP and a microprocessor, a combination of a plurality of microprocessors, a combination of one or more microprocessors combined with a DSP core, or a combination of any other such components. In addition, the 'memory' should be interpreted broadly so as to encompass any electronic component capable of storing electronic information. The 'memory' may also refer to various types of processor-readable media, such as random-access memory (RAM), read-only memory (ROM), non-volatile random-access memory (NVRAM), programmable read-only memory (PROM), erasable-programmable read-only memory (EPROM), electrically erasable PROM (EEPROM), flash memory, magnetic or optical data storage, registers, etc. A memory is said to be in electronic communication with a processor if the processor can read information from and/or write information to the memory. A memory integrated with a processor is in electronic communication with the processor.

As used herein, expressions such as "first" and "second" are used to distinguish one object from another when referring to a plurality of objects of the same kind unless the context indicates otherwise, and do not limit the order or importance among the relevant objects.

As used herein, expressions such as "A, B, and C," "A, B, or C," "A, B, and/or C," or "at least one of A, B, and C," "at least one of A, B, or C one," "at least one of A, B, and/or C," "at least one selected from A, B, and C," "at least one selected from A, B, or C," and "at least one selected from A, B, and/or C" may mean all possible combinations of each listed item or listed items. For example, "at least one selected from A and B" may refer to all of (1) A, (2) at least one of A's, (3) B, (4) at least one of B's, (5) at least one of A's and at least one of B's, (6) at least one of A's and B, (7) at least one of B's and A, (8) A and B.

As used herein, the expression "based on" is used to describe one or more factors that affect the action or operation of a decision or determination described in the phrase or sentence including the expression, and this expression does not preclude additional factors that affect the action or operation of that decision or determination.

As used herein, the expression that a component (e.g., a first component) is "connected" or "coupled" to another component (e.g., a second component) may mean that said component is connected or coupled to said another component directly, as well as connected or coupled via yet another component (e.g., a third component).

As used herein, the expression "configured to" may have the meaning of "set to," "having the ability to," "modified to," "made to," "capable of," etc., depending on the context. The expression is not limited to the meaning of "designed specifically in hardware," and for example, a processor configured to perform a particular operation may refer to a generic-purpose processor capable of performing that particular operation by executing software.

Hereinafter, various embodiments of the present disclosure will be described with reference to the accompanying drawings. In the accompanying drawings and description of the drawings, identical or substantially equivalent components may be given the same reference numerals. Further, in the description of various embodiments below, repetitive descriptions of the same or corresponding components may be omitted, which, however, does not mean that such components are not included in that embodiment.

Basic Structure of Computing System

FIG. 1 is a diagram describing the basic configuration of a computing system in accordance with one embodiment of the present disclosure.

Referring to FIG. 1, the computing system may include a processor (CPU), a main storage device used by the processor (CPU) to directly read or write commands or data of a program executed via the processor (CPU), and an auxiliary storage device to assist the main storage device. Further, the processor (CPU) of the computing system may include a first cache memory device, and may include a second cache memory device between the processor (CPU) and the main storage device. The first cache memory device refers to a cache in a form built into the processor (CPU), and the second cache memory device refers to a cache formed on a main board or the like outside the processor (CPU). The cache memory device in accordance with embodiments of the present disclosure may be the first cache memory device or the second cache memory device, and may be any one of L1, L2, and L3 caches that are commonly mentioned, but is not limited thereto.

The cache memory device serves as a temporary storage that retrieves and temporarily stores data from the main storage device or the auxiliary storage device in advance according to the principle of locality of reference so that the processor can access the data at high speeds by reducing the bottleneck of the data by reducing the difference between the computation speed of the processor and the memory access speed.

Meanwhile, the queue depth of the cache scheduler of the cache memory device represents the number of commands that can be arbitrarily processed at once in a storage resource, and determines the range in which the respective commands can be processed out of order in the cache scheduler. The cache memory device in accordance with embodiments of the present disclosure proposes measures for securing scalability of the queue depth of cache schedulers by utilizing N (where N is an integer greater than or equal to 2) cache schedulers, i.e., a plurality of cache schedulers. According to embodiments, the traffic of input transactions from a processor (CPU) is monitored, a variable input transaction region is set for each of the plurality of schedulers based on the traffic of the input transactions monitored, and input transactions from the processor (CPU) are transferred to the corresponding cache schedulers via these input transaction regions, and, thereby the scalability of queue depth via the plurality of cache schedulers can be maximized. This will be described in detail below.

Cache Memory Device Including Multi-Cache Scheduler Architecture

Figure 2:
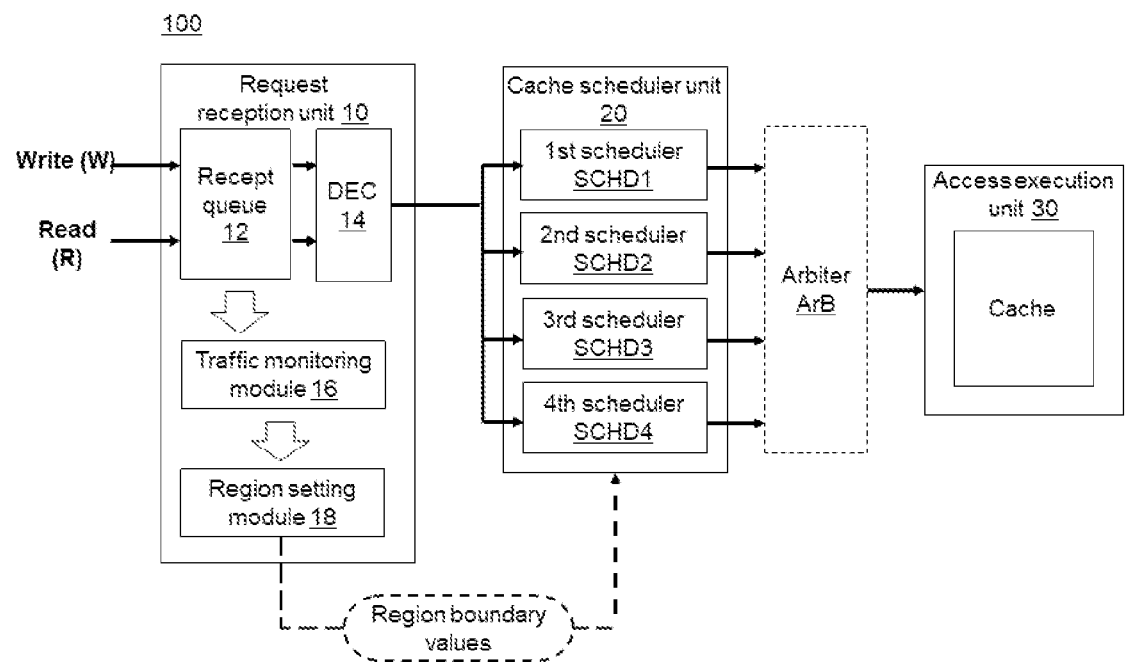
FIG. 2 is a diagram schematically showing a cache memory device including a multi-cache scheduler architecture in accordance with one embodiment of the present disclosure.

FIG. 2 is a diagram schematically showing a cache memory device including a multi-cache scheduler architecture in accordance with one embodiment of the present disclosure.

Referring to FIG. 2, a cache memory device 100 including a multi-cache scheduler architecture in accordance with one embodiment of the present disclosure may include a request reception unit 10, a cache scheduler unit 20, and an access execution unit 30.

The request reception unit 10 may receive input transactions including write W commands and read R commands from the processor (CPU). These input transactions may be sent and received via a bus structure (not shown) between the processor and the cache memory device 100. Further, the request reception unit 10 may packetize and classify the received input transactions. Accordingly, the request reception unit 10 may include a reception queue (request queue) 12 for receiving input transactions, and a decoder DEC 14 for decoding the received input transactions, respectively, and packetizing them into a size suitable for memory access in units of cache lines.

In addition, according to one embodiment of the present disclosure, the request reception unit 10 may include a traffic monitoring module 16 for monitoring the traffic of input transactions received in the reception queue 12, and a region setting module 18 for setting N input transaction regions corresponding to each of the N cache schedulers SCHD1, SCHD2, SCHD3, and SCHD4 in the cache scheduler unit 20 based on the traffic of the input transactions monitored. However, the traffic monitoring module 16 and the region setting module 18 are distinguished from each other for convenience of description, but the two modules may be implemented as one integrated module. Further, according to one embodiment, the traffic monitoring module 16 may be implemented as a hardware module and the region setting module 18 may be implemented as a software module, but the two modules may each be implemented as a hardware module or a software module, and are not limited thereto. Moreover, the region setting module 18 may be implemented by being included in the cache memory device 100, or may be implemented outside the cache memory device 100 (e.g., in the processor (CPU)), but is not limited thereto. As one example, if the region setting module 18 is implemented by means of a processor (CPU), traffic monitoring data is received from the traffic monitoring module 16 of the cache memory device 100 and is analyzed and processed in the region setting module 18 of the processor (CPU), and region boundary values for setting the N input transaction regions may be generated and transmitted directly to the cache scheduler unit 20.

The traffic monitoring module 16 may monitor the traffic of the input transactions via a method such as logging by examining the address of each input transaction through the reception queue 12. Accordingly, the number of memory accesses according to the address of each of the input transactions can be monitored.

The region setting module 18 may set N input transaction regions corresponding to each of the N cache schedulers SCHD1, SCHD2, SCHD3, and SCHD4 based on the traffic of the input transactions monitored, e.g., the number of memory accesses according to the address of each of the input transactions. Accordingly, input transactions packetized by the decoder 14 may be transferred via the input transaction region set for each cache scheduler.

According to one embodiment of the present disclosure, setting the N input transaction regions in the region setting module 18 may include generating a histogram representing the number of memory accesses to the address of each of the input transactions, computing locations in the generated histogram where the integral values for each of the N input transaction regions are equal, and setting N input transaction regions based on the calculated locations.

Figure 3:
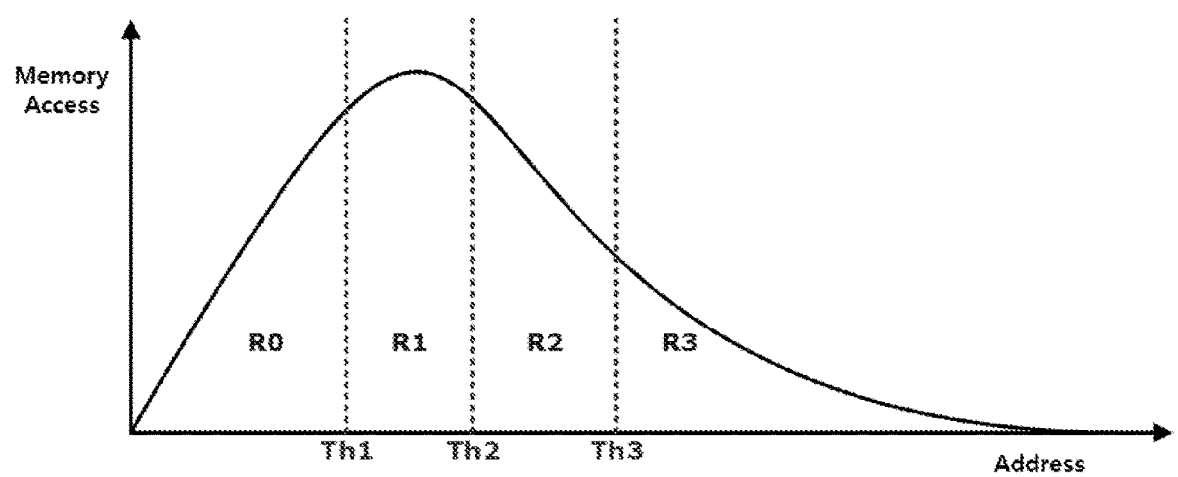
FIG. 3 is a diagram showing an example of a histogram generated by a region setting module of a cache memory device in accordance with one embodiment of the present disclosure.

FIG. 3 is a diagram showing an example of a histogram generated by a region setting module of a cache memory device in accordance with one embodiment of the present disclosure.

FIG. 3 assumes a situation in which four cache schedulers SCHD1, SCHD2, SCHD3, and SCHD4 are present in the cache scheduler unit 20. Referring to FIG. 3, the region setting module 18 may generate a histogram in which the x-axis represents the addresses of the input transactions and the y-axis represents the number of memory accesses for each address. In the example of FIG. 3, the region setting module 18 may set four input transaction regions R0, R1, R2, and R3 corresponding to each of the four cache schedulers SCHD1, SCHD2, SCHD3, and SCHD4 in the histogram, and more specifically, compute the integral values of the respective input transaction regions R0, R1, R2, and R3, i.e., the locations where the area of each region in the histogram is all equal, define those locations as region boundary values Th1, Th2, and Th3 of the respective input transaction regions R0, R1, R2, and R3, and set four input transaction regions R0, R1, R2, and R3 based thereon.

Here, according to one embodiment of the present disclosure, setting the N input transaction regions R0, R1, R2, and R3 in the region setting module 18 may be performed based on the traffic of the input transactions during a first predetermined period before the time point of setting the N input transaction regions R0, R1, R2, and R3. Accordingly, there arises an effect of being able to perform region setting based on the traffic of relatively recent input transactions at the time point of setting the regions. In another example, the input transaction regions R0, R1, R2, and R3 may also be set by taking into account all the traffic of input transactions accumulated since the time point at which the regions were set previously in the region setting module 18.

The cache scheduler unit 20 in accordance with one embodiment of the present disclosure may include a plurality (N) of cache schedulers, for example, a first cache scheduler SCHD1, a second cache scheduler SCHD2, a third cache scheduler SCHD3, and a fourth cache scheduler SCHD4. However, the configuration with four cache schedulers as shown in FIG. 2 is merely an example, and the number of cache schedulers is not limited. Each cache scheduler may receive input transactions via an input transaction region that corresponds to itself, and may schedule memory accesses, including cache memory accesses and direct memory accesses DMA corresponding to the received input transactions.

In this process, in order to increase memory access efficiency, each cache scheduler of the cache scheduler unit 20 may perform scheduling by applying complex mechanisms such as the Tomasulo algorithm that supports various functions such as out-of-order execution and completion, write early completion, etc. As one example, the cache scheduler performs a very complex scheduling process such as (1) checking the dependency of data, (2) determining traffic that can be processed out of order, and (3) processing out-of-order completion. Therefore, the cache scheduler unit 20 falls within a module with high complexity among all the designs of the cache memory device 100. This high complexity serves as a factor that makes it difficult to increase the queue depth of the cache scheduler. The queue depth represents the number of commands that can be arbitrarily processed at once in a storage resource, and determines the range in which the respective commands can be processed out of order in the cache scheduler. Therefore, the queue depth of the cache scheduler falls within an important parameter that ultimately determines the processing performance of the entire cache, and thus it is necessary to increase the queue depth as much as possible in order to increase the required system performance.

Accordingly, the cache memory device 100 in accordance with one embodiment of the present disclosure has N (N is an integer greater than or equal to 2) cache schedulers SCHD1, SCHD2, SCHD3, and SCHD4 in the cache scheduler unit 20, and allocates an input transaction region with a statistically identical memory access rate to each cache scheduler based on the number of memory accesses for each address of the input transactions, and thus has a remarkable effect of being able to utilize the queue depth of each of the N cache schedulers to the fullest extent. In particular, the number of memory accesses for each address of the input transactions in accordance with one embodiment is ultimately based on the data structure of programs, commands, or the like that are statistically frequently used by users, and thus probabilistically increases the possibility that each cache scheduler will be utilized to the fullest extent.

Meanwhile, each cache scheduler may include at least one of a reorder scheduling queue RSQ and a completion scheduling queue CSQ. Such a cache scheduler unit 20 may be included in the cache controller or may be formed as a separate module.

Each cache scheduler of the cache scheduler unit 20 may be allowed to perform cache memory accesses by checking data dependency, whether out-of-order traffic can be allocated, and the like, and subsequently performing scheduling on the input transactions transferred via the input transaction region allocated to itself, and transmitting them to the access execution unit 30.

An arbiter ArB is located between the cache scheduler unit 20 and the access execution unit 30, and may connect the N cache schedulers SCHD1, SCHD2, SCHD3, and SCHD4 of the cache scheduler unit 20 to the access execution unit 30. The arbiter ArB may act to prevent bottlenecks from occurring by ensuring that memory accesses between the cache schedulers can be maintained at similar numbers.

The access execution unit 30 may perform cache memory accesses on the received input transactions via a cache tag. As a result of performing cache memory accesses, in the case of a cache hit in which data corresponding to a particular input transaction (packet) is present in the cache, the access result may be transferred to the completion scheduling queue CSQ of the cache scheduler unit 20 and queued. And, the completion scheduling queue CSQ may transfer the queued access results to the processor (CPU) in the original order (i.e., the order in which the processor transmitted the commands). To this end, the completion scheduling queue CSQ may receive order information of each command from the decoder. On the other hand, as a result of performing cache memory accesses, in the case of a cache miss in which data corresponding to a particular input transaction (packet) is not present in the cache, direct memory access DMA may be performed on the main storage device and/or the auxiliary storage device.

Figure 4:
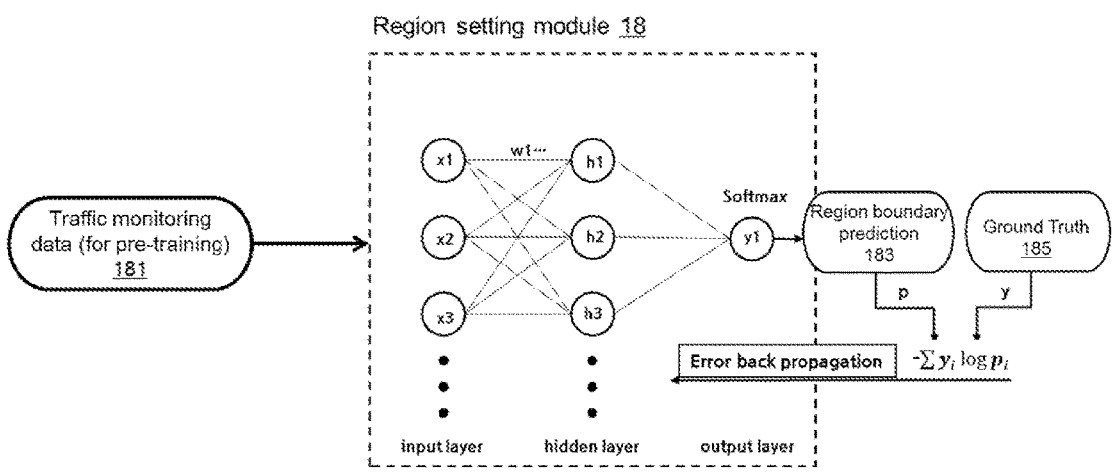
FIG. 4 is a diagram showing an example in which an artificial neural network module is applied to a region setting module of a cache memory device in accordance with one embodiment of the present disclosure.
Figure 4:
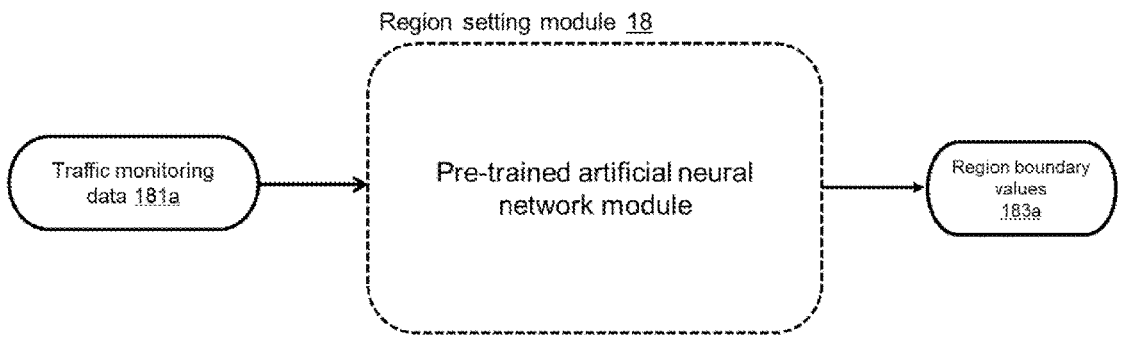

FIG. 4 is a diagram showing an example in which an artificial neural network module is applied to a region setting module of a cache memory device in accordance with one embodiment of the present disclosure.

Referring to FIG. 4, the region setting module 18 may include an artificial neural network module, and may output region boundary values 183a for setting N input transaction regions corresponding to each of the N cache schedulers based on traffic monitoring data 181a via this artificial neural network module. This is distinguished from the region setting module 18 that derives the region boundary values based on the area (integral value) of each input transaction region by using a histogram.

The artificial neural network module may include at least one of artificial neural network modules such as, for example, a transformer, an LSTM (long-short term memory), an RNN (recurrent neural network), a CNN (convolution neural network), a GAN (generative adversarial network), and an AE (AutoEncoder), or machine learning models such as multi-layer perceptron, Naive-Bayesian classification, and random forest classification may also be used.

Described specifically, in a pre-training session of the artificial neural network module of the region setting module 18, traffic monitoring data 181 for pre-training may be provided as input to the artificial neural network module. Such traffic monitoring data 181 for pre-training may be samples obtained by performing monitoring on input transactions for a particular period of time, and there is no limitation on the method of obtaining such data.

Then, the artificial neural network module may output region boundary prediction data 183 based on the inputted traffic monitoring data 181 for pre-training. This region boundary prediction data 183 may be a prediction of region boundary values in order to optimally set the N input transaction regions corresponding to each of the N cache schedulers.

In addition, the region boundary prediction data 183 outputted by the artificial neural network module in the pre-training session may be compared with region boundary values calculated as an actual ideal, i.e., ground truth 185. As a result of this comparison, the artificial neural network module may be pre-trained such that the loss function ($-\Sigma y_i \log p_i$) between the region boundary prediction data 183 and the ground truth 185 is minimized. As one example, the artificial neural network module may employ a method of updating the weights of the hidden layers based on a loss function or error between the region boundary prediction data 183 and the ground truth 185. Multiple pieces of traffic monitoring data 181 for pre-training are inputted to each node of the input layer such as x1, x2, and x3, and pass through hidden layers such as h1, h2, and h3 based on weights such as w1, and region boundary prediction data 183 predicted based on a cost function such as softmax is outputted to the output layer of y1. And, the weights of the artificial neural network module may be updated by back propagation based on the error ($-\Sigma y_i \log p_i$) between the region boundary prediction data 183 and the ground truth 185.

After such a pre-training session is completed, in the inference session, when traffic monitoring data 181a from the traffic monitoring module is inputted to the pre-trained artificial neural network module of the region setting module 18, the pre-trained artificial neural network module may output region boundary values 183a based thereon. Then, the region setting module 18 may set N input transaction regions corresponding to each of the N cache schedulers based on these region boundary values 183a.

However, the specific method of implementing the artificial neural network module can be varied in a variety of ways, and is not limited to the implementation method described above.

Figure 5:
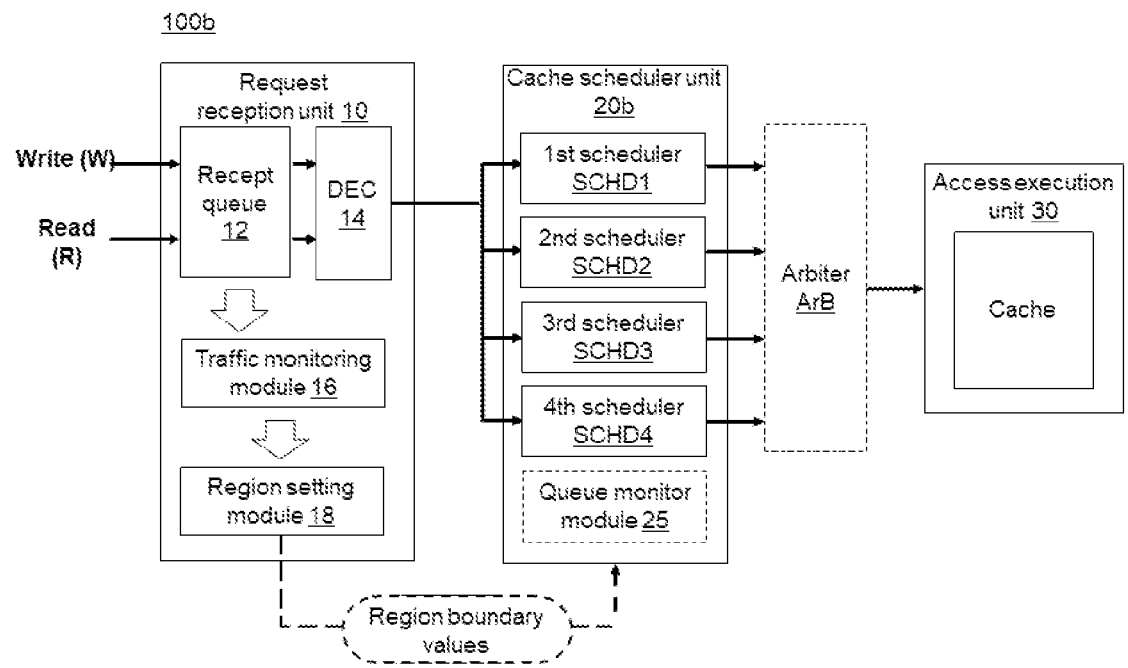
FIG. 5 is a diagram schematically showing a cache memory device including a multi-cache scheduler architecture in accordance with another embodiment of the present disclosure.

FIG. 5 is a diagram schematically showing a cache memory device including a multi-cache scheduler architecture in accordance with another embodiment of the present disclosure.

Referring to FIG. 5, a cache memory device 100b including a multi-cache scheduler architecture in accordance with another embodiment of the present disclosure may include a request reception unit 10, a cache scheduler unit 20b, and an access execution unit 30.

The cache memory device 100b of FIG. 5 has a difference compared with the cache memory device 100 described above with reference to FIG. 2 in that the cache scheduler unit 20b includes a queue monitoring module 25.

The queue monitoring module 25 is a module for monitoring whether input transactions (packets) remain in the queue of each of the N cache schedulers SCHD1, SCHD2, SCHD3, and SCHD4 of the cache scheduler unit 20b.

According to another embodiment of the present disclosure, setting the N input transaction regions R0, R1, R2, and R3 in the region setting module 18 may be performed if there are no input transactions remaining in all of the N cache schedulers SCHD1, SCHD2, SCHD3, and SCHD4 (i.e., Q Level=0; IDLE state) as a result of the monitoring by the queue monitoring module 25. This is because there may occur problems such as missing memory accesses if the regions are set or reset when there are input transactions remaining in the cache scheduler.

Alternatively, according to another embodiment of the present disclosure, setting the N input transaction regions R0, R1, R2, and R3 in the region setting module 18 may be performed if there are no input transactions remaining in at least some of the N cache schedulers SCHD1, SCHD2, SCHD3, and SCHD4 (i.e., Q Level=0; IDLE state) as a result of the monitoring by the queue monitoring module 25. Setting the input transaction regions at this time may correspond to resetting the region boundary values between cache schedulers that have been confirmed to have no remaining input transactions.

As one example, if two schedulers SCHD2 and SCHD3 out of the N cache schedulers SCHD1, SCHD2, SCHD3, and SCHD4 have no input transactions (i.e., are empty) and the rest of the schedulers have input transactions remaining (busy), resetting can only be made to the region boundary value between SCHD2 and SCHD3. There arises an effect of enabling the utilization of the queue depth of the cache schedulers to be more efficient by resetting the region boundary values between schedulers that are in the IDLE state out of order even if it is not the case where each region boundary value may be sequential (e.g., in the order of Th1, Th2, and Th3 in FIG. 3).

Alternatively, according to another embodiment of the present disclosure, setting the N input transaction regions R0, R1, R2, and R3 in the region setting module 18 may include waiting until there are no remaining input transactions by not receiving additional input transactions if input transactions remaining in all of the N cache schedulers SCHD1, SCHD2, SCHD3, and SCHD4 at predetermined periods are below a threshold as a result of the monitoring by the queue monitoring module 25, and resetting the N input transaction regions R0, R1, R2, and R3 corresponding to each of the N cache schedulers SCHD1, SCHD2, SCHD3, and SCHD4 based on the traffic of the input transactions monitored if it is confirmed by the queue monitoring module 25 that there are no input transactions remaining in all of the N cache schedulers SCHD1, SCHD2, SCHD3, and SCHD4 as a result of the waiting.

Method for Implementing Cache Scheduling

Figure 6:
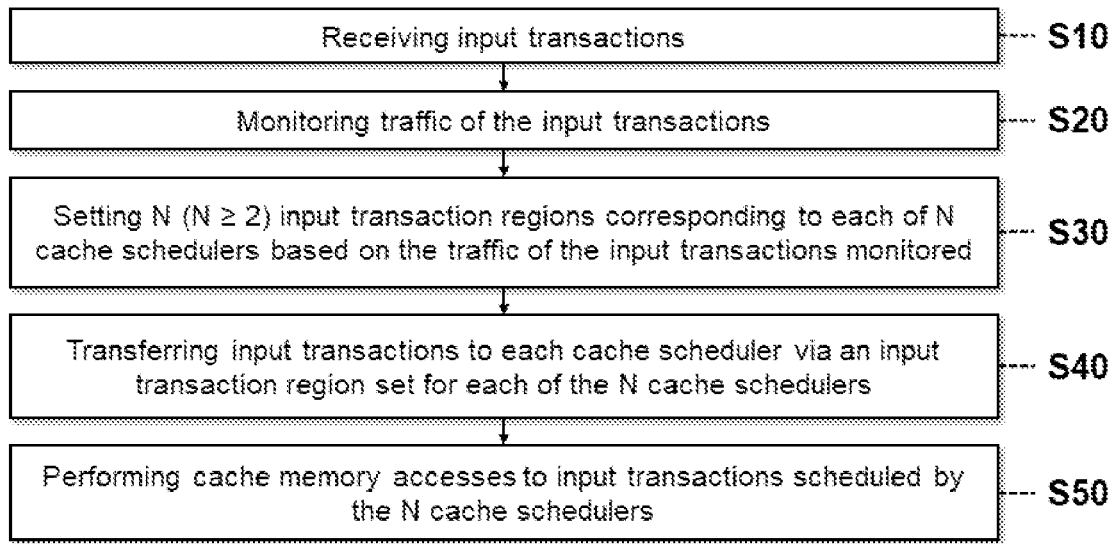
FIG. 6 is a flowchart of a method for implementing cache scheduling in accordance with one embodiment of the present disclosure.

FIG. 6 is a flowchart of a method for implementing cache scheduling in accordance with one embodiment of the present disclosure.

Referring to FIG. 6, first, in step S10, input transactions may be received. The reception of these input transactions may be performed via the reception queue 12 of the request reception unit 10, and the received input transactions may each be decoded and packetized into a size suitable for memory accesses in units of cache lines by the decoder 14.

In step S20, the traffic of the input transactions may be monitored. This may involve a process of examining the addresses of the respective input transactions via the reception queue 12 and logging the traffic of the input transactions. As a result, the number of memory accesses according to the address of each of the input transactions may be monitored.

In step S30, N input transaction regions corresponding to each of N (N is an integer greater than or equal to 2) cache schedulers may be set based on the traffic of the input transactions monitored.

Here, according to one embodiment, setting the N input transaction regions may include generating a histogram representing the number of memory accesses to the address of each of the input transactions, computing locations in the generated histogram where the integral values for each of the N input transaction regions are equal, and setting N input transaction regions based on the calculated locations.

According to another embodiment, setting the N input transaction regions may include inputting the traffic of the input transactions monitored into an artificial neural network module, analyzing the inputted traffic by the artificial neural network module, and outputting region boundary values for setting the N input transaction regions based on the analysis results. Such an artificial neural network module may be a module that has undergone a pre-training process using large amounts of data, or may be a module that is trained to derive optimal results through rewards in a reinforcement learning method.

In step S40, the input transactions may be transferred to each cache scheduler via the input transaction region set for each of the N cache schedulers. Each cache scheduler may check data dependency, whether out-of-order traffic can be allocated, and the like, and then perform scheduling on the input transactions transferred via the input transaction region allocated to itself, and transmit them to the access execution unit.

In step S50, cache memory accesses may be performed to the input transactions scheduled by the N cache schedulers.

Computer Readable Recording Medium

It is apparent that each step or operation of the method according to the embodiments of the present disclosure may be performed by a computer including one or more processors according to the execution of a computer program stored in a computer-readable recording medium.

The computer-executable instructions stored in the computer-readable recording medium may be implemented through a computer program programmed to perform each corresponding step, but such computer program may be stored in the computer-readable recording medium, and it is executable by a processor. The computer-readable recording medium may be a non-transitory readable medium. In this case, the non-transitory readable medium refers to a medium that stores data semi-permanently and can be read by a machine, which is different from a medium that stores data temporarily, such as a register, cache, memory, etc. Specifically, programs for performing the various methods described above may be provided while stored in a non-transitory readable medium such as semiconductor memory devices such as erasable programmable read-only memory (EPROM), electrically erasable programmable read-only memory (EEPROM), and flash memory devices, a magnetic disk such as internal hard disks and removable disks, an optical-magnetic disk, and a non-volatile memory including a CD-ROM and a DVD-ROM disk.

Methods according to the embodiments disclosed in the present disclosure may be provided by being included in a computer program product. The computer program product may be distributed in the form of a machine-readable storage medium (e.g., compact disc read only memory (CD-ROM)) or via online through an application store (e.g., Play Store™). In case of online distribution, at least part of the computer program product may be temporarily stored or temporarily generated in a storage medium such as a memory of a server of a manufacturer, a server of an application store, or a relay server.

Those skilled in the art to which the present disclosure pertains will be able to understand that the present disclosure may also be conducted in other specific forms without changing the technical spirit or essential features thereof. Therefore, the embodiments of the present disclosure are to be understood in all respects as illustrative and not restrictive. The scope of the present disclosure is presented by the following claims rather than the detailed description, and all changes or modifications derived from the meaning and scope of the claims and equivalent concepts thereof should be construed as being included in the scope of the present disclosure.

The features and advantages described herein are not all inclusive, and many additional features and advantages will become apparent to those skilled in the art, particularly upon consideration of the drawings, the specification, and the claims. Moreover, it should be noted that the language used herein has been selected primarily for the purpose of readability and explanation, and has not been selected to limit the subject matter of the present disclosure.

The above description of the embodiments of the present disclosure has been presented for purposes of illustration. It is not intended to be exhaustive or to limit the invention to the precise form disclosed. Those skilled in the art will appreciate that many modifications and variations are possible in light of the present disclosure.

Therefore, the scope of the present invention is not limited by the detailed description, but by the claims of the present disclosure. Accordingly, the embodiments of the present disclosure is illustrative and not intended to limit the scope of the present invention as set forth in the following claims.

What is claimed is:

1. A cache memory device comprising:
a request reception unit configured to receive input transactions;
a traffic monitoring module configured to monitor traffic of the input transactions;
N cache schedulers, wherein N is an integer greater than or equal to 2;
a region setting module configured to set N input transaction regions corresponding to each of the N cache schedulers based on the traffic of the input transactions monitored, wherein input transactions are transferred via an input transaction region set in each cache scheduler; and
an access execution unit configured to perform cache memory accesses to input transactions scheduled by the N cache schedulers,
wherein setting the N input transaction regions by the region setting module comprises:
generating a histogram representing the number of memory accesses to addresses of the input transactions;
computing locations in the histogram where integral values for each of the N input transaction regions are equal; and
setting the N input transaction regions based on the computed locations, and
wherein the setting the N input transaction regions by the region setting module is performed if there are no input transactions remaining in all or at least some of the N cache schedulers.

2. The cache memory device of claim 1, wherein the setting the N input transaction regions in the region setting module is performed based on traffic of input transactions during a first predetermined period before a time point of performing the setting of the N input transaction regions.

3. The cache memory device of claim 1, wherein the setting the N input transaction regions in the region setting module comprises:
waiting until there are no remaining input transactions by not receiving additional input transactions if input transactions remaining in all of the N cache schedulers at predetermined periods are below a threshold; and
resetting the N input transaction regions corresponding to each of the N cache schedulers based on the traffic of the input transactions monitored if there are no input transactions remaining in all of the N cache schedulers.

4. A method for implementing cache scheduling, wherein the method is performed by a cache memory device, the method comprising:
receiving input transactions;
monitoring traffic of the input transactions;
setting N (N is an integer greater than or equal to 2) input transaction regions corresponding to each of N cache schedulers based on the traffic of the input transactions monitored;
transferring input transactions to each cache scheduler via an input transaction region set for each of the N cache schedulers; and
performing cache memory accesses to input transactions scheduled by the N cache schedulers,
wherein the setting the N input transaction regions comprises:
generating a histogram representing the number of memory accesses to addresses of the input transactions;
computing locations in the histogram where integral values for each of the N input transaction regions are equal; and
setting the N input transaction regions based on the computed locations, and
wherein the setting the N input transaction regions is performed if there are no input transactions remaining in all or at least some of the N cache schedulers.

5. The method for implementing cache scheduling of claim 4, wherein the setting the N input transaction regions is performed based on traffic of input transactions during a first predetermined period before a time point of performing the setting of the N input transaction regions.

6. The method for implementing cache scheduling of claim 4, wherein the setting the N input transaction regions comprises:

waiting until there are no remaining input transactions by not receiving additional input transactions if input transactions remaining in all of the N cache schedulers at predetermined periods are below a threshold; and resetting the N input transaction regions corresponding to each of the N cache schedulers based on the traffic of the input transactions monitored if it is confirmed as a result of the waiting that there are no input transactions remaining in all of the N cache schedulers.

7. A computing system comprising:

a processor;

a main storage device configured to store commands or data associated with a program executed via the processor;

an auxiliary storage device configured to assist the main storage device; and a cache memory device located between the processor and the main storage device and configured to temporarily store commands or data of the main storage device or the auxiliary memory device, wherein the cache memory device comprises:

a request reception unit configured to receive input transactions;

a traffic monitoring module configured to monitor traffic of the input transactions;

N cache schedulers, wherein N is an integer greater than or equal to 2;

a region setting module configured to set N input transaction regions corresponding to each of the N cache schedulers based on the traffic of the input transactions monitored, wherein input transactions are transferred via an input transaction region set in each cache scheduler; and an access execution unit configured to perform cache memory accesses to input transactions scheduled by the N cache schedulers, wherein setting the N input transaction regions by the region setting module comprises:

generating a histogram representing the number of memory accesses to addresses of the input transactions;

computing locations in the histogram where integral values for each of the N input transaction regions are equal; and setting the N input transaction regions based on the computed locations, and wherein the setting the N input transaction regions by the region setting module is performed if there are no input transactions remaining in all or at least some of the N cache schedulers.

* * * * *